(12) United States Patent
Nirula et al.

(10) Patent No.: US 11,812,336 B2
(45) Date of Patent: Nov. 7, 2023

(54) POSITION ACCURACY IMPROVEMENT USING SMART SATELLITE VEHICLE SELECTION

(71) Applicant: QUALCOMM Incorporated, San Diego, CA (US)

(72) Inventors: Gautam Nirula, Santa Clara, CA (US); Amol Kench, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 16/666,841

(22) Filed: Oct. 29, 2019

(65) Prior Publication Data

US 2021/0124058 A1   Apr. 29, 2021

(51) Int. Cl.
| | | |
|---|---|---|
| *H04W 4/02* | (2018.01) | |
| *G01S 19/22* | (2010.01) | |
| *G01S 19/26* | (2010.01) | |
| *G06V 20/58* | (2022.01) | |
| *H04N 23/54* | (2023.01) | |
| *H04N 23/61* | (2023.01) | |
| *H04N 23/90* | (2023.01) | |
| *G06V 10/80* | (2022.01) | |
| *G01S 17/89* | (2020.01) | |

(52) U.S. Cl.
CPC ............ *H04W 4/026* (2013.01); *G01S 19/22* (2013.01); *G01S 19/26* (2013.01); *G06V 10/80* (2022.01); *G06V 20/58* (2022.01); *H04N 23/54* (2023.01); *H04N 23/61* (2023.01); *H04N 23/90* (2023.01); *G01S 17/89* (2013.01)

(58) Field of Classification Search
CPC .......... G01S 19/22; G01S 19/26; G01S 17/89; H04N 5/23218; H04N 5/2253; H04N 5/247; G06K 9/00805; H04W 4/026
USPC ..................................................... 342/357.61
See application file for complete search history.

(56) References Cited

U.S. PATENT DOCUMENTS

| | | | |
|---|---|---|---|
| 10,495,762 B2 | 12/2019 | Niesen et al. | |
| 2015/0319729 A1* | 11/2015 | MacGougan | ......... H04W 4/023 455/456.1 |
| 2017/0059715 A1* | 3/2017 | Wietfeldt | ................ G01S 19/28 |
| 2017/0124781 A1* | 5/2017 | Douillard | .............. G01S 17/931 |
| 2017/0237942 A1* | 8/2017 | Arikuma | ............ G08B 13/1672 348/159 |
| 2018/0227853 A1* | 8/2018 | Kench | ..................... H04L 43/16 |
| 2019/0094379 A1* | 3/2019 | Chhokra | ................. G01S 19/45 |
| 2019/0147619 A1* | 5/2019 | Goldman | ............... G01B 11/03 382/154 |

(Continued)

*Primary Examiner* — Matthew David Kim
(74) *Attorney, Agent, or Firm* — Thien T. Nguyen

(57) ABSTRACT

Techniques for improved GNSS positioning include leveraging approximate location information and information from sensors of a mobile device, and/or sensors communicatively coupled therewith, to detect obstructions and determine which SVs may be blocked from direct view. In particular, information from one or more cameras, LIDAR, radar, and/or other sensor systems can be used to determine how nearby obstructions may block the view of portions of the sky from the perspective of the mobile device, then compared with a SkyPlot of SVs based on the mobile device's approximate location to determine which SVs are likely blocked from view. A GNSS position determination of the mobile device can then be made by reducing the weight of information received from blocked (obstructed) SVs.

24 Claims, 9 Drawing Sheets

(56) References Cited

U.S. PATENT DOCUMENTS

2019/0164020 A1\* 5/2019 Sabripour ............... G06F 18/24
2019/0191146 A1\* 6/2019 Koyama ................... G06T 7/20
2020/0034989 A1\* 1/2020 Koyama .............. H04N 13/243

\* cited by examiner

POSITION ACCURACY IMPROVEMENT USING SMART SATELLITE VEHICLE SELECTION

BACKGROUND

Mobile phones, vehicles, and other modern mobile devices often use position information to provide various types of functionality. Often times, these devices will use Global Navigation Satellite Systems (GNSS), such as Global positioning system (GPS) and/or similar satellite-based positioning technologies to obtain this positioning information. Problematically, however, the performance of GNSS drastically degrades if large parts of the sky are obstructed. This therefore occurs frequently in urban environments where large buildings often obstruct parts of the sky, causing GNSS to provide far less accurate positioning information. This less accurate positioning information, in turn, can result in poor functionality of mobile devices.

These positioning errors in GNSS are largely due to multipath errors in received satellite signals. That is, satellite signals may reflect off of buildings or other objects and can travel a much longer path to the mobile device, resulting in significant positioning errors. Detecting and excluding (or otherwise de-weighting) multipath signals from positioning or location determinations may therefore be necessary for good positioning performance in urban scenarios. Current techniques for identifying and excluding multipath signals in a GNSS-based position determination, however, are often not reliable.

BRIEF SUMMARY

Techniques described herein address these and other issues by leveraging approximate location information and information from sensors of a mobile device, and/or sensors communicatively coupled therewith, to detect obstructions and determine which SVs may be blocked from direct view. In particular, information from one or more cameras, LIDAR, radar, and/or other sensor systems can be used to determine how nearby obstructions may block the view of portions of the sky from the perspective of the mobile device, then compared with a SkyPlot of SVs based on the mobile device's approximate location to determine which SVs are likely blocked from view. A GNSS position determination of the mobile device can then be made by reducing the weight of information received from blocked (obstructed) SVs.

An example method of GNSS position determination of a mobile device, according to the description, comprises obtaining a first position estimate of the mobile device at a location, without using current GNSS data. The method further comprises determining, based on the first position estimate, approximate locations of a plurality of satellite vehicle (SVs) in the sky, from a perspective of the mobile device, and obtaining sensor information regarding one or more obstructions, where each obstruction of the one or more obstructions obstructs a view of at least a portion of the sky from the perspective of the mobile device, and the sensor information comprises a LIDAR image, a camera image, or both. The method further comprises determining, based on the approximate locations of the plurality of SVs and the sensor information regarding one or more obstructions, one or more obstructed SVs of the plurality of SVs, obtaining satellite information from each SV of the plurality of SVs, and determining a second position estimate of the mobile device. Determining the second position estimate comprises weighting the respective satellite information obtained from each of the one or more obstructed SVs less than the respective satellite information obtained from each of one or more unobstructed SVs of the plurality of SVs.

An example mobile device, according to the description, comprises a Global Navigation Satellite System (GNSS) receiver, a memory, and a processing unit communicatively coupled with the GNSS receiver and the memory. The processing unit is configured to obtain a first position estimate of the mobile device at a location, without using current GNSS data. The processing unit is further configured to determine, based on the first position estimate, approximate locations of a plurality of satellite vehicle (SVs) in the sky, from a perspective of the mobile device, and obtain sensor information regarding one or more obstructions, where each obstruction of the one or more obstructions obstructs a view of at least a portion of the sky from the perspective of the mobile device, and the sensor information comprises a LIDAR image, a camera image, or both. The processing unit is also configured to determine, based on the approximate locations of the plurality of SVs and the sensor information regarding one or more obstructions, one or more obstructed SVs of the plurality of SVs, obtain, using the GNSS receiver, satellite information from each SV of the plurality of SVs, and determine a second position estimate of the mobile device. Determining the second position estimate comprises weighting the respective satellite information obtained from each of the one or more obstructed SVs less than the respective satellite information obtained from each of one or more unobstructed SVs of the plurality of SVs.

An example device for making a Global Navigation Satellite System (GNSS) position determination of a mobile device, according to the description, comprises means for obtaining a first position estimate of the mobile device at a location, without using current GNSS data. The device further comprises means for determining, based on the first position estimate, approximate locations of a plurality of satellite vehicle (SVs) in the sky, from a perspective of the mobile device, and means for obtaining sensor information regarding one or more obstructions, where each obstruction of the one or more obstructions obstructs a view of at least a portion of the sky from the perspective of the mobile device, and the sensor information comprises a LIDAR image, a camera image, or both. The device further comprises means for determining, based on the approximate locations of the plurality of SVs and the sensor information regarding one or more obstructions, one or more obstructed SVs of the plurality of SVs, means for obtaining satellite information from each SV of the plurality of SVs, and means for determining a second position estimate of the mobile device. The means for determining the second position estimate comprise means for means for weighting the respective satellite information obtained from each of the one or more obstructed SVs less than the respective satellite information obtained from each of one or more unobstructed SVs of the plurality of SVs.

An example non-transitory, computer-readable medium, according to the description, comprises instructions stored thereby for Global Navigation Satellite System (GNSS) position determination of a mobile device. The instructions, when executed by one or more processors, cause the one or more processors to obtain a first position estimate of the mobile device at a location, without using current GNSS data. The instructions, when executed by one or more processors, further cause the one or more processors to determine, based on the first position estimate, approximate locations of a plurality of satellite vehicle (SVs) in the sky, from a perspective of the mobile device, and obtain sensor information regarding one or more obstructions, where each obstruction of the one or more obstructions obstructs a view of at least a portion of the sky from the perspective of the mobile device, and the sensor information comprises a LIDAR image, a camera image, or both. The instructions, when executed by one or more processors, further cause the one or more processors to determine, based on the approximate locations of the plurality of SVs and the sensor information regarding one or more obstructions, one or more obstructed SVs of the plurality of SVs, obtain satellite information from each SV of the plurality of SVs, and determine a second position estimate of the mobile device. Determining the second position estimate comprises weighting the respective satellite information obtained from each of the one or more obstructed SVs less than the respective satellite information obtained from each of one or more unobstructed SVs of the plurality of SVs.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments are described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
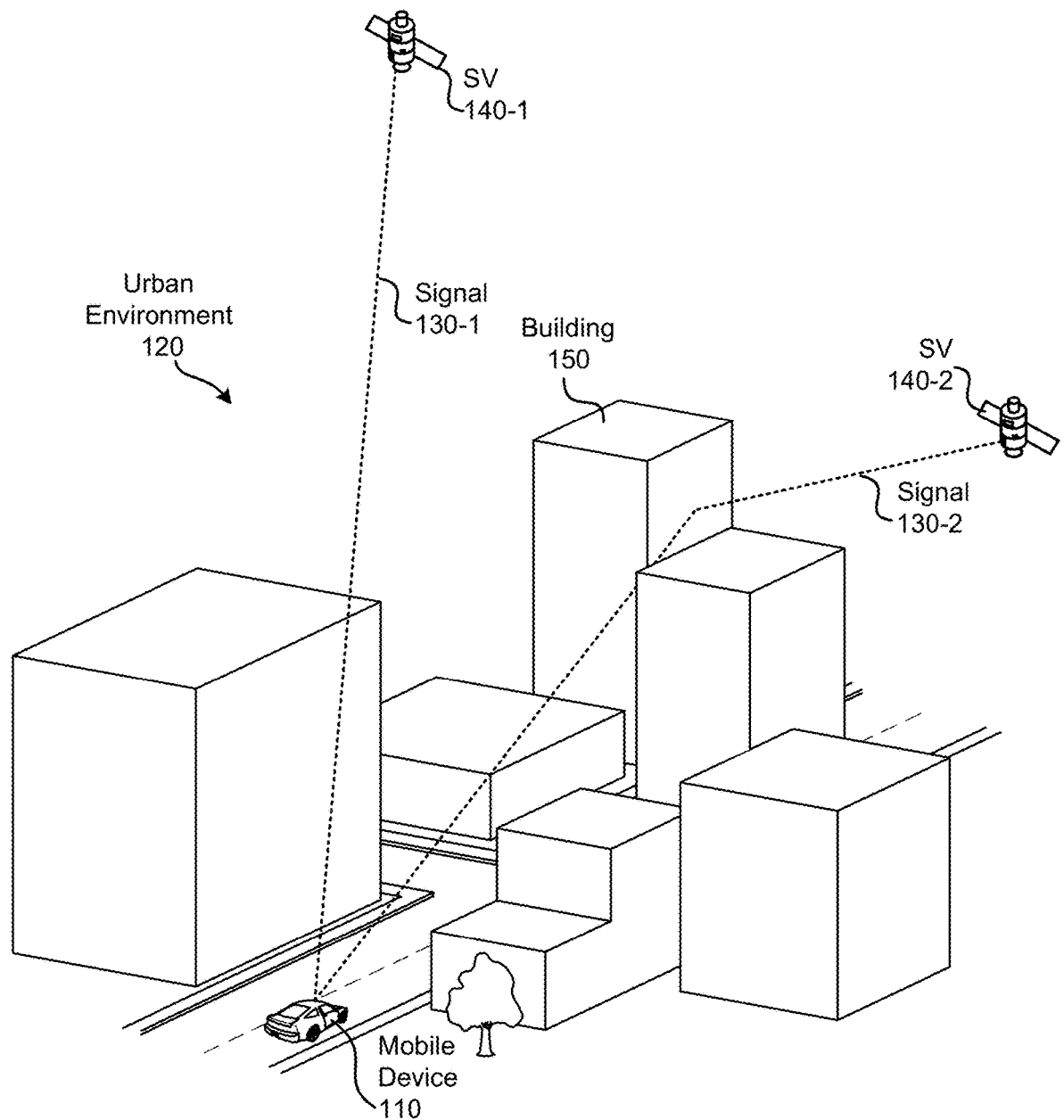
FIG. 1 is a simplified illustration provided to help illustrate the problem of multipath in certain environments.

FIG. 1 is a simplified illustration provided to help illustrate the problem of multipath in urban environments (or other environments in which a view of the sky from the perspective of a mobile device may be similarly obstructed). Here, a mobile device 110 (a vehicle) is traveling in an urban environment 120. To determine a position of the mobile device 110, the mobile device 110 is equipped with a GNSS receiver capable of receiving radio frequency (RF) signals 130-1 and 130-2 (collectively and generically referred to as signals 130) from corresponding satellite vehicles (SVs) 140-1 and 140-2 (collectively and generically referred to as SVs 140).

Because the first signal 130-1 from the first SV 140-1 travels directly from the SV 140-1 to the mobile device 110, the first signal 130-1 can be reliably used by the GNSS receiver to provide accurate positioning for the mobile device 110. On the other hand the second signal 130-2, with is transmitted from a second SV 140-2 is obstructed from direct view by the mobile device 110, experiences multipath by reflecting off of a building 150, following an indirect route to the mobile device 110 from the second SV 140-2. As noted, because this indirect route is longer than a direct route, the GNSS receiver at the mobile device 110 may conclude the second SV 140-2 is further away, and generate a less accurate position determination than if the second signal 130-2 did not experience multipath. The resulting position determination may be off by many meters from the actual position of the mobile device 110. This can be highly problematic for applications requiring a high degree of accuracy for the position determination, such as automated vehicle driving and navigation.

It can be noted that the scenario illustrated in FIG. 1 is greatly simplified, as a person of ordinary skill in the art will appreciate. Signals from an unobstructed SV (e.g., first SV 140-1) for example, may still experience multipath by traveling both direct and indirect paths to the mobile device 110. However, multipath in these instances (in which a direct-path signal is detected) may be somewhat easy to correct. Thus, as generally referred to herein, the term "multipath" refers to signals from obstructed SVs (e.g., signal 130-2 from 140-2) that take an indirect route to the mobile device 110.

Embodiments address these and other issues by leveraging approximate location information and information from additional sensors of the mobile device 110 to determine which SVs 140 may be obstructed (blocked from direct view) from the point of view of the mobile device 110. Information from one or more cameras, LIDAR, radar, and/or other sensor systems can be used to determine the height of surrounding obstructions, then compared with a SkyPlot of SVs 140 based on the mobile device's approximate location to determine which SVs 140 are likely blocked from view. Information from signals 130 received from the blocked SVs, then, can be de-weighted accordingly.

Figure 2:
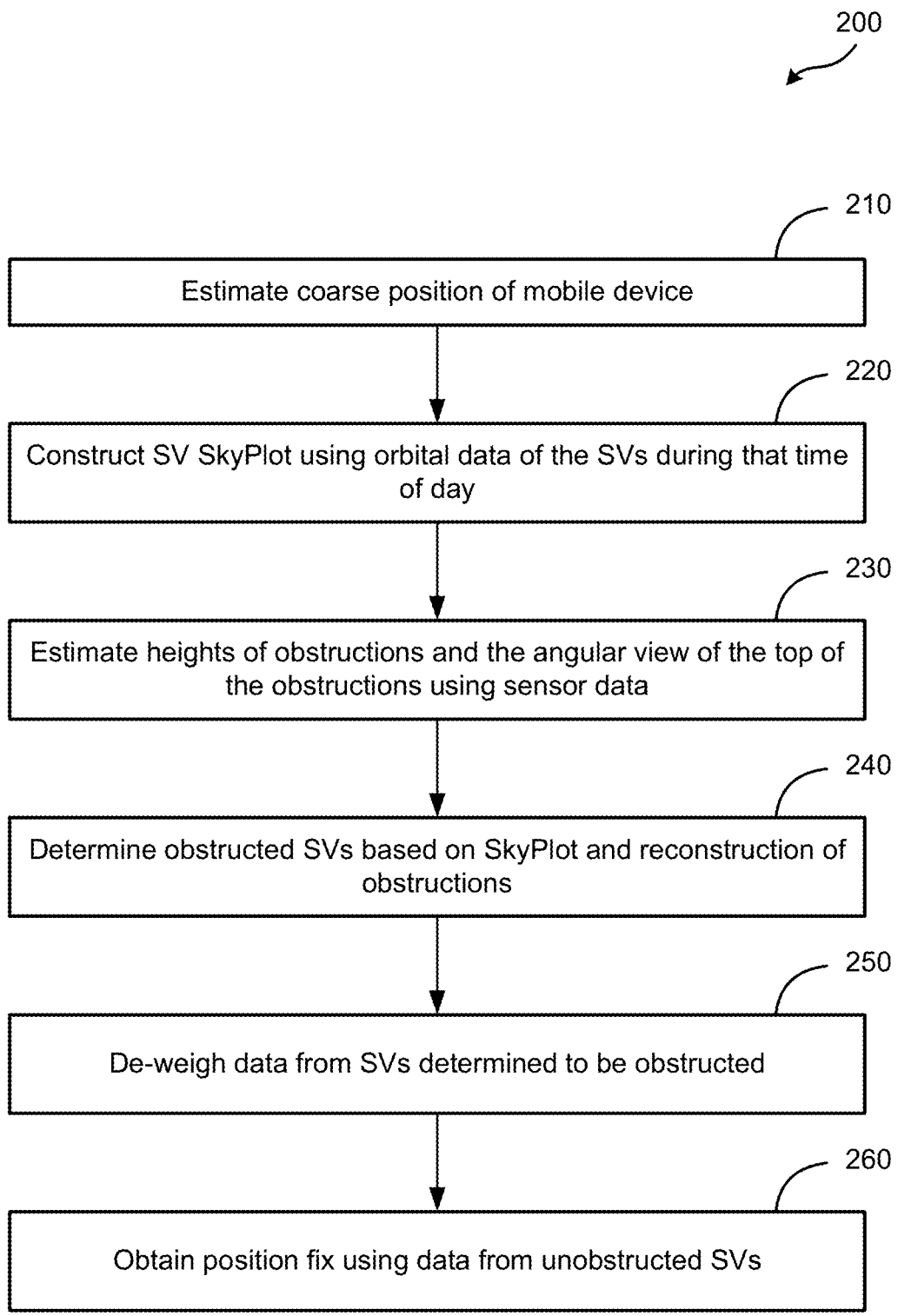
FIG. 2 is a flow diagram illustrating a method for a GNSS determination of a mobile device, according to an embodiment.
Figure 8:
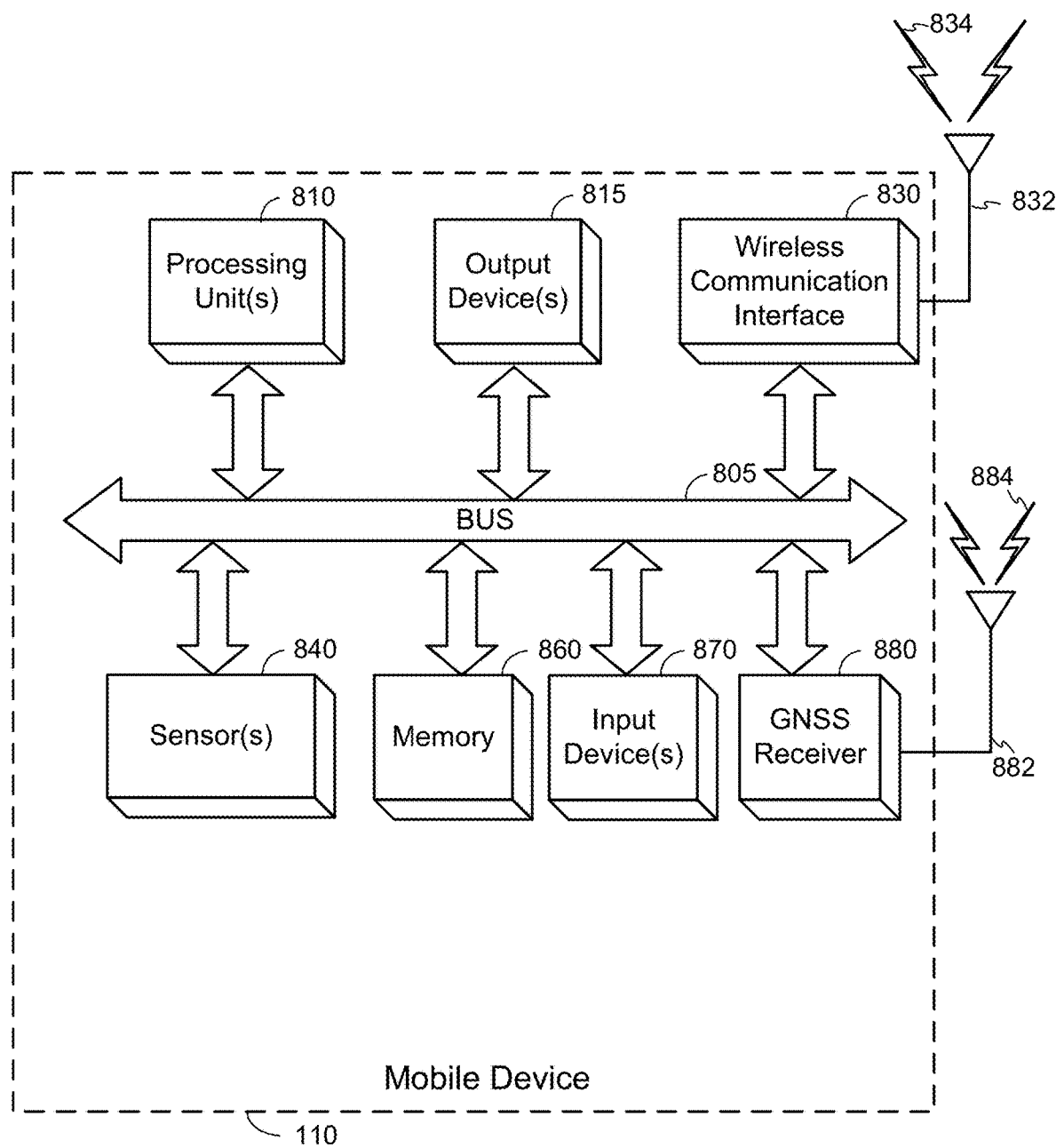
FIG. 8 is a block diagram of electrical components of a mobile device, according to an embodiment.

FIG. 2 is a flow diagram illustrating a method 200 for a GNSS determination of a mobile device 110, according to an embodiment. It will be understood that alternative embodiments may perform various functions into a different order than illustrated, depending on desired functionality. For example, in some embodiments, the functionality of block 230 may be performed prior to or at the same time as the functionality illustrated in block 220. Means for performing the various functions illustrated in the blocks of FIG. 2 may comprise hardware and/or software elements of a mobile device 110, an example of which is shown in FIG. 8 and described in more detail below.

At block 210, the functionality comprises estimating a coarse position of the mobile device 110. This coarse position can be based on non-GNSS data, one or more network-based positioning methods (e.g., Positioning using Wi-Fi access point ID, cell ID, Observed Time Difference Of Arrival (OTDOA), Positioning Reference Signals (PRS), and the like), dead reckoning (e.g., based on motion data and a previously-known position), camera-based positioning (e.g., identifying objects with known positions in images) or the like. Depending on positioning method used, this may involve communicating with other devices, such as an access point, base station, positioning server, etc. Additionally or alternatively, it may use sensors and/or devices incorporated into the mobile device 110 and/or communicatively coupled therewith.

At block 220, a SkyPlot is constructed in which the locations of SVs in the sky, relative to the estimated coarse position of the mobile device 110. That is, using SV orbital data and the estimated coarse position of the mobile device 110, the elevation and azimuth of various SVs can be determined.

Figure 3:
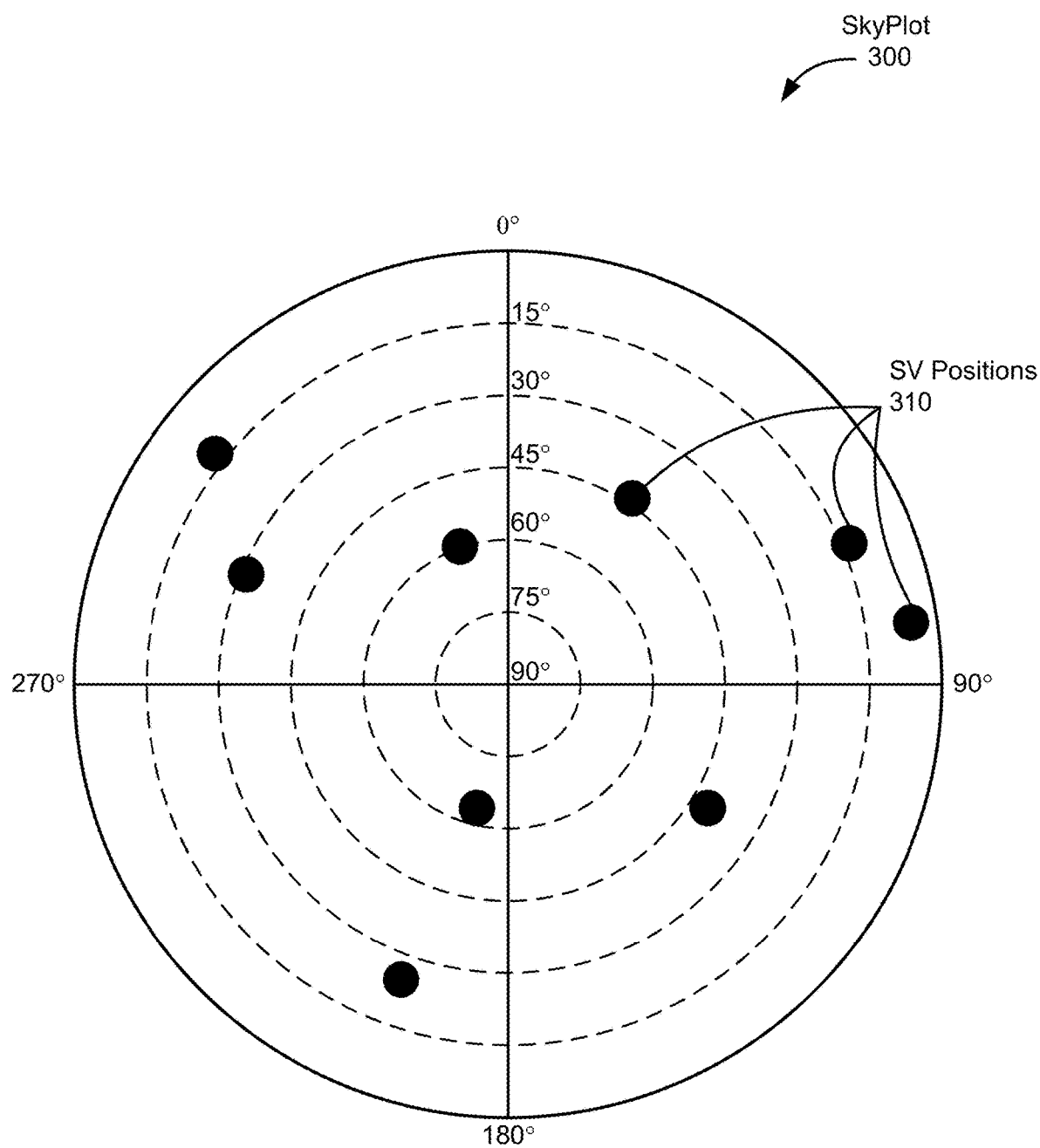
FIG. 3 is an illustration of an example SkyPlot.

FIG. 3 is an illustration of an example SkyPlot 300 in which the SV positions 310 of the various SVs viewable by the mobile device 110 at the estimated coarse position are shown, according to an embodiment. (To avoid clutter, only a few SV positions 310 are labeled in FIG. 3.) As a person of ordinary skill in the art will appreciate, the SkyPlot 300 indicates azimuth along the circumference of the SkyPlot (labeled 0°, 90°, 180°, and 270°), and elevation within the SkyPlot itself (labeled 0°, 15°, 30°, 45°, 60°, 75°, and 90°). Each SV position 310 plotted on the SkyPlot 300, therefore, represents the respective azimuth and elevation of an SV 140, relative to the mobile device 110.

Because the various SV positions 310 may be obtained with respect to an absolute reference frame (e.g., the east north up (ENU) reference frame) or other reference frame not associated with the mobile device 110, an orientation of the mobile device 110 with respect to the reference frame may further be determined, to determine the SV positions with respect to the mobile device 110. Orientation information of the mobile device 110 may be determined using an inertial measurement unit (IMU), magnetometer, map information, and/or other sources.

Referring again to FIG. 2, the functionality at block 230 comprises estimating heights of obstructions and the angular view of the top of the obstructions using sensor data. According to some embodiments, this may be used to create a 3-D reconstruction of the obstructions 420 that may be used as described in further detail below. Here, the various sensors of the mobile device 110 can be leveraged to obtain this information. Automated vehicles and mobile phones, for example, both come with a large variety of sensors that may be used to obtain this information. Further, as noted in more detail below, information from sensors of other devices communicatively coupled with the mobile device 110 additionally or alternatively may be used.

Figure 4:
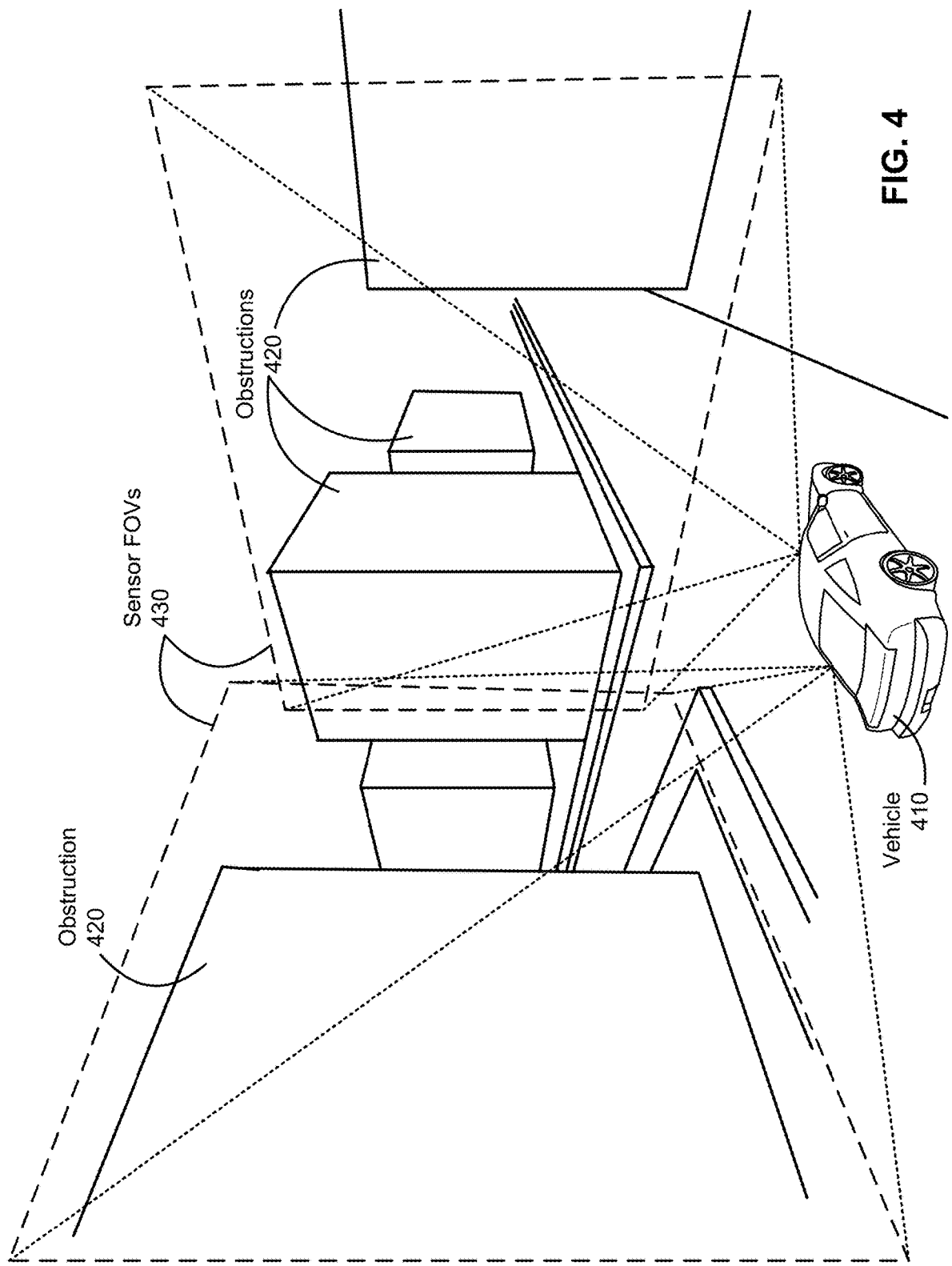
FIG. 4 is a perspective view of a scenario in which a mobile device comprising a vehicle can obtain information to estimate the heights of nearby obstructions, according to an embodiment.

FIG. 4 is a perspective view of a scenario in which a mobile device comprising a vehicle 410 can obtain information to estimate the heights of nearby obstructions 420, according to an embodiment. Here, the vehicle 410 may include one or more cameras, LIDAR, or radar capable of scanning obstructions 420 within the respective sensor fields of view (FOVs) 430 to determine their height. It will be understood that, although obstructions 420 are illustrated as buildings, obstructions 420 additionally or alternatively may comprise trees, towers, walls, and/or other objects that may block the view of the sky from the perspective of the vehicle 410.

Where LIDAR is available, for example, it can be particularly helpful. Because LIDAR is capable of providing 3-D information (e.g., a 3-D point cloud) of a scanned area within the sensor FOV 430 of the LIDAR, the information can be particularly useful when creating a 3-D reconstruction of the obstructions 420. Additionally, LIDAR can provide more information than a visible camera in situations of heavy fog, rain, night, or simply bad lighting.

That said, embodiments may additionally or alternatively use camera information. That is, using one or more cameras disposed on the vehicle 410, the vehicle 410 can take one or more images of the environment within the sensor FOV 430 of each camera. Further, images may not be limited to visible light, but may additionally or alternatively utilize infrared (IR) and/or ultraviolet (UV) frequencies, depending on desired functionality.

Some embodiments may use radar to obtain height and angle information of the obstructions 420 in the vehicle's environment. Currently, radar has the potential of giving longer-range information then LIDAR, and may be advantageous over cameras in situations of adverse weather or lighting conditions that make reduce the reliability of camera images.

To provide a more robust solution, data from multiple sensors and/or sensor types may be fused to provide a more complete picture of the nearby obstructions 420. For example, images multiple cameras covering separate sensor FOVs 430 may be stitched together to provide a larger image with a larger FOV. In some configurations, cameras located at various points on the vehicle 410 may be capable of providing image data for the full 360° around the vehicle 410. Data from radar and LIDAR may be similarly stitched together. Moreover, data from different sensor types can be fused to more accurately determine the height, distance, and/or width of the obstructions 420 detected by both sensor types. For example, where an obstruction 420 is detected by both camera and LIDAR, data from both the camera and LIDAR may be used to accurately determine a height of the obstruction 420. Using a multi-sensor approach in this manner may provide a more robust solution than using any single sensor alone. Optical data from a camera, for example, may be used to get information regarding obstructions further away, whereas LIDAR and/or radar may be used to gather more accurate information for nearby obstructions 420. Some embodiments may be able to use one sensor or multiple sensors, depending on the availability of the sensors, quality of sensor information, and/or other factors.

As noted, embodiments are not limited to vehicles. A mobile device 110 may comprise any of a variety of mobile electronic devices having (or in communication with) sensors capable of providing height information regarding surrounding obstructions 420.

Figure 5:
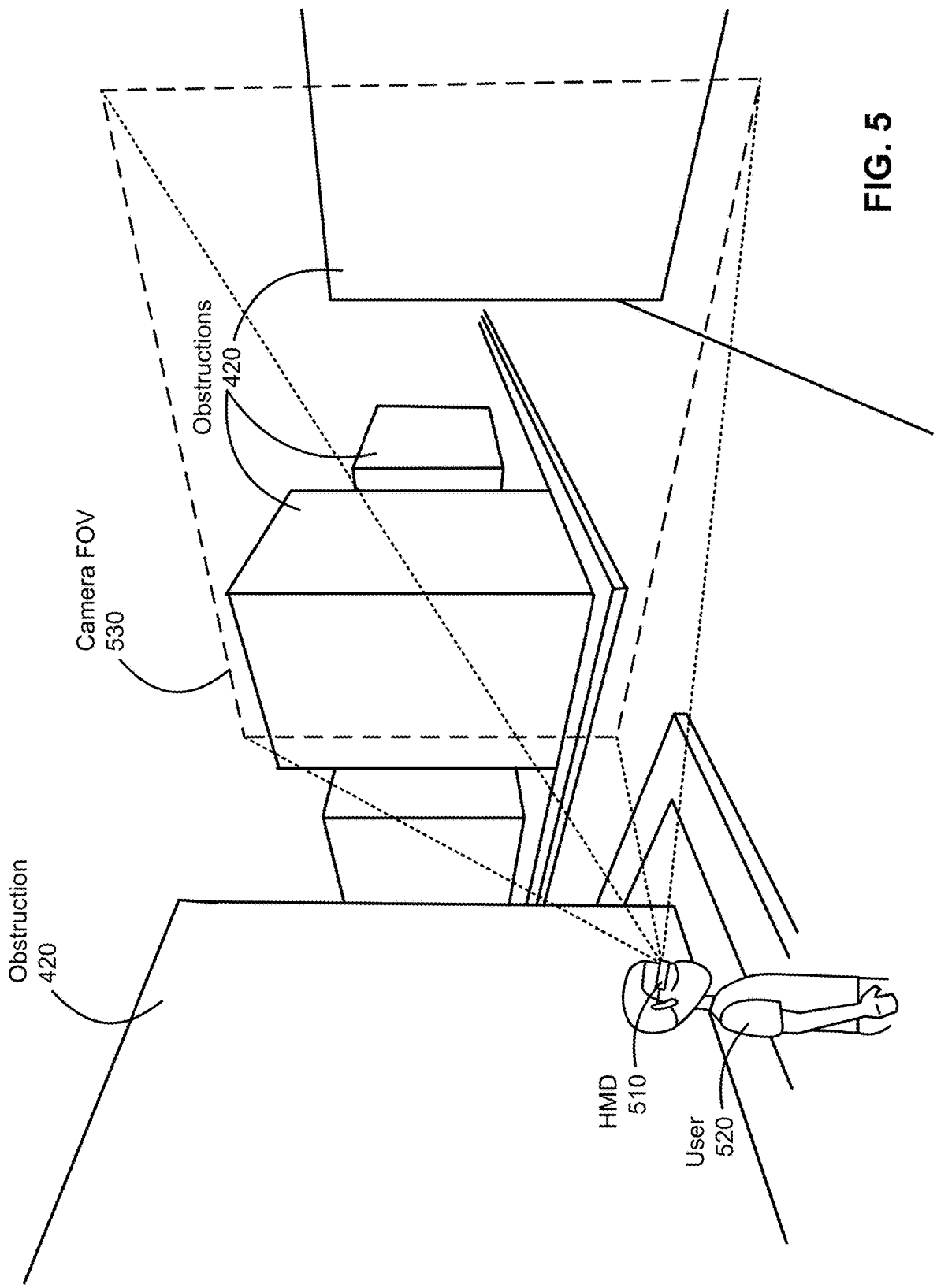
FIG. 5 is an illustration of a scenario in which a mobile device may gather sensor data regarding obstructions from a head-mounted display HMD.

FIG. 5, for example, is an illustration of a scenario in which a mobile device 110 (not shown) comprises a cellular phone carried by the user 520 and communicatively coupled with an HMD 510. (Alternatively, the mobile device may comprise the HMD 510 itself.) Here, the cellular-phone may be a in the pocket of a user 520, and therefore unable to take images of its surroundings using cameras that may be integrated into the mobile device 110. However, because it is communicatively coupled with the HMD 510, it still may be able to obtain images of the obstructions 420 from a camera of the HMD 510, which can take images of obstructions 420 in the camera FOV 530. Because the HMD 510, worn by the user 520, is at substantially the same location as the mobile device 110 (also carried by the user 520), the determined position of the obstructions 420 with respect to the HMD 510 (as determined from images taken by a camera of the HMD 510) may be assumed to be the approximate position of the obstructions 420 with respect to the mobile device 110. (That said, if a relative position of the HMD 510 is known with respect to the mobile device 110, some embodiments may account for this difference when determining the position of the obstructions 420 with respect to the mobile device 110.) It can be noted that the techniques described with regard to FIG. 5 are not limited to an HMD 510, and may be applied to other types of wearable devices capable of providing a mobile device with an image of one or more surrounding obstructions 420. Such devices may include, for example, smart watches, smart hats, and/or other types of wearable sensors having cameras integrated there with.

Obtaining image and/or other sensor information may vary, depending on desired functionality. In some embodiments where the mobile device 110 comprises a cellular phone communicatively coupled with an HMD 510, for example, a user 520 may be prompted to look in certain directions to enable image capture of all obstructions 420 nearby, or in directions where data regarding obstructions 420 may be lacking. Additionally or alternatively, the mobile device 110 (e.g., vehicle 410, cellular phone, etc.) may use a camera and/or other sensors opportunistically. That is, because other hardware and/or software of the mobile device 110 may utilize sensors for other purposes, embodiments may employ software and/or hardware on the mobile device 110 (e.g., a software application or "app") to gather sensor information collected by one or more sensors during the course of regular operation and/or activate/employ sensors when they are not otherwise being used.

Depending on desired functionality, the information regarding obstructions 420 can be used in multiple ways to determine how obstructions may impact signals received from SVs 130 at the various SV positions 310 of a SkyPlot 300. According to some embodiments, for example, angle information regarding surrounding obstructions 420 alone may be sufficient to determine an angular view of the top of the obstructions 420 to determine how obstructions 420 impact signals received at the current location of the mobile device 110. (In such instances, the estimated heights need not be determined at block 230 of FIG. 2.) However, as previously noted, some embodiments may additionally or alternatively create a 3-D reconstruction of the nearby obstructions 420, allowing the mobile device 110 to further determine how the obstructions 420 may impact signals received by the mobile device 110 after the mobile device 110 has moved. In so doing, embodiments may provide a more robust solution for determining multipath for SVs 130 in an area, without the need to constantly obtain sensor data to account for mobile device movement.

To create a 3-D reconstruction of nearby obstructions 420, a mobile device 110 can measure or estimate the height, distance, and width of the obstruction 420 in any of a variety of ways. This can vary, depending on the type of sensor data available to the mobile device 110. For example, some mobile devices (e.g., a vehicle 410) may be able to obtain LIDAR data regarding obstructions 420, which can provide 3-D information (e.g., a 3-D point cloud) natively, based on round-trip time.

Camera information may be used differently. Stereoscopic cameras, for example, may be able to provide depth information for each pixel in a stereoscopic image. Otherwise, two cameras may be used to take a picture of a single obstruction 420 and determine height based on the focal length of the cameras and relative position of each camera. This information can then be used together with the images to determine the height and width of the obstruction 420. As a person of ordinary skill in the art will appreciate, a similar process may be used by a single camera taking images at two locations, where distance between the locations is known (e.g., by using an IMU and/or other sensors to track movement between capture of each image).

Figure 6:
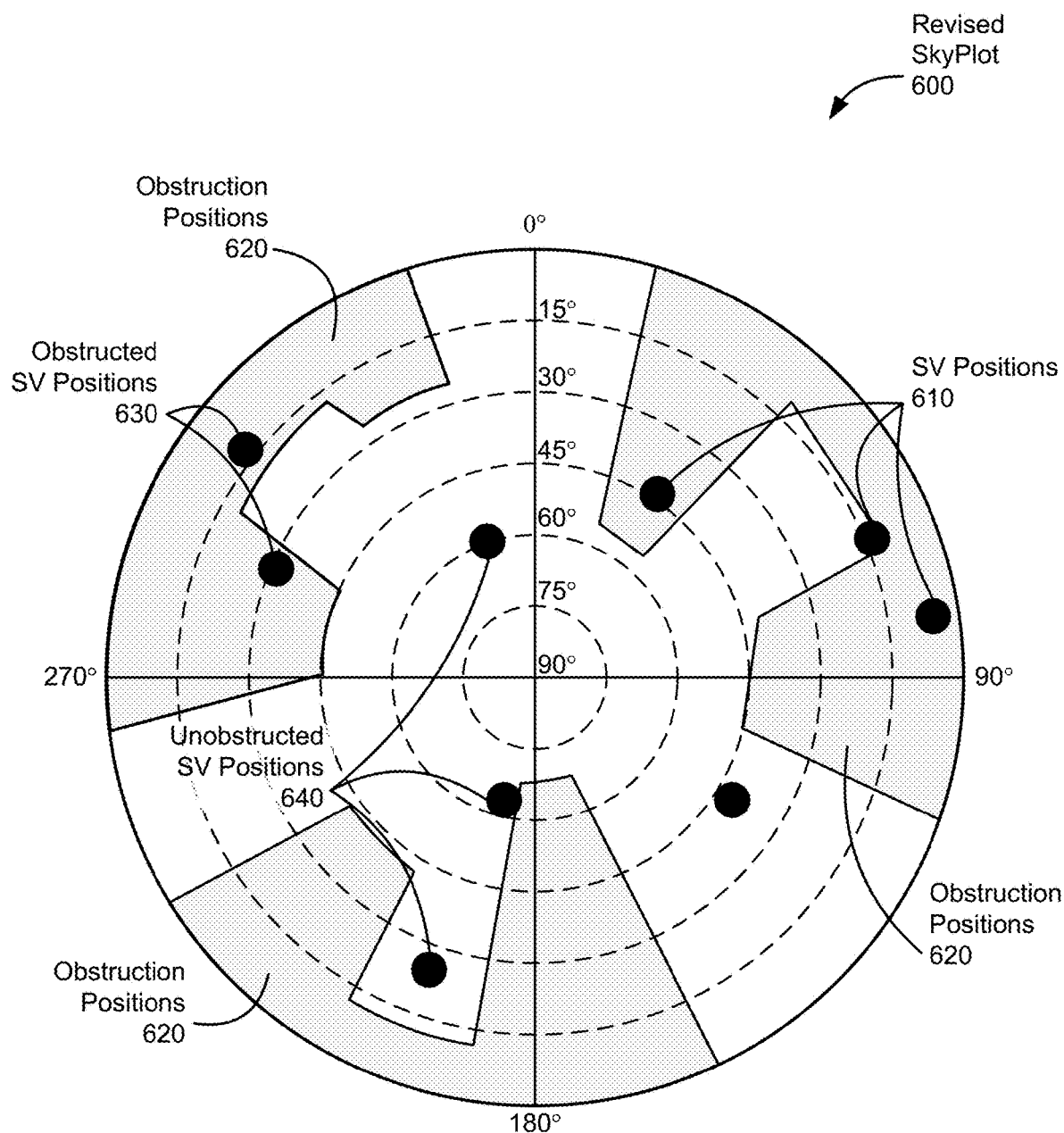
FIG. 6 is an illustration of a revised SkyPlot, showing how the SkyPlot of FIG. 3 can be revised to show how detected obstructions may obstruct one or more of the plotted SV positions, according to an embodiment.

Referring again to FIG. 2, with the dimensions (e.g., heights, distances and widths) of the obstructions estimated at block 230, the method 200 can continue to block 240, where the functionality comprises determining obstructed SVs based on the SkyPlot constructed in block 220 and a reconstruction of the obstructions. FIG. 6 illustrates an example of how this can be done.

FIG. 6 is an illustration of a revised SkyPlot 600, illustrating how the SkyPlot 300 of FIG. 3 can be revised to show how obstructions 420 may impact signals 130 from SVs 140 at various SV positions 610, according to an embodiment. Here, the SV positions 610 corresponds to the SV positions 310 of FIG. 3. (Again, not all SV positions 610 are labeled, to help reduce clutter.) Additionally, however, the revised SkyPlot 600 includes obstruction positions 620 indicating how the various obstructions 420 block a view of the sky from the position of the mobile device 110, based on the sensor data regarding the surrounding obstructions 420. According to some embodiments, the obstruction positions 620 can be represented on the SkyPlot 600 based on information obtained from a 3-D reconstruction of the obstructions 420.

Figure 9A:
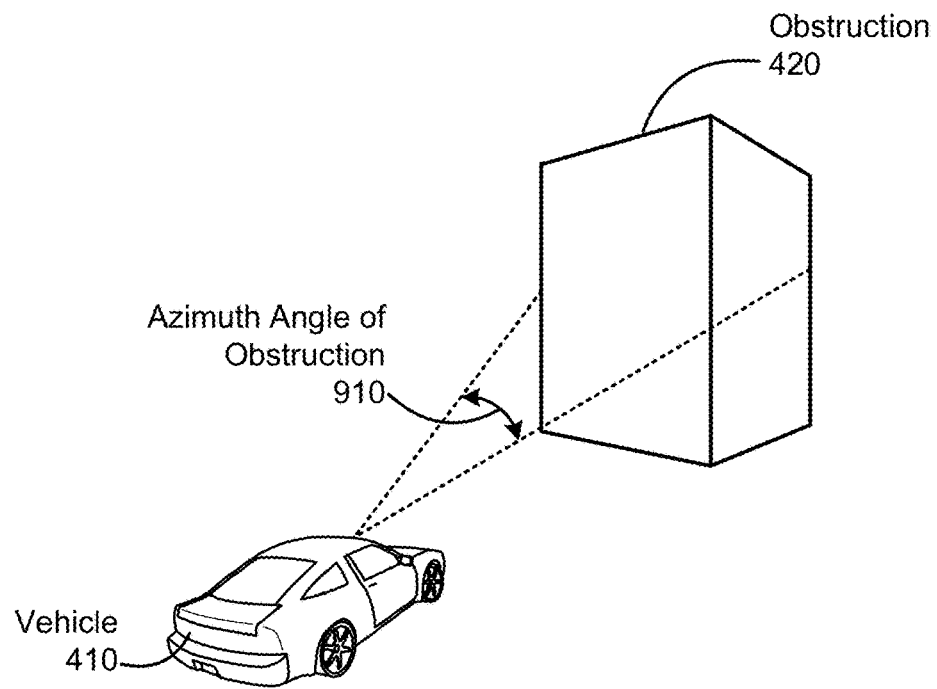
FIGS. 9A and 9B are perspective views of an example scenario, illustrating the azimuth angle and elevation angle of an obstruction.
Figure 9B:
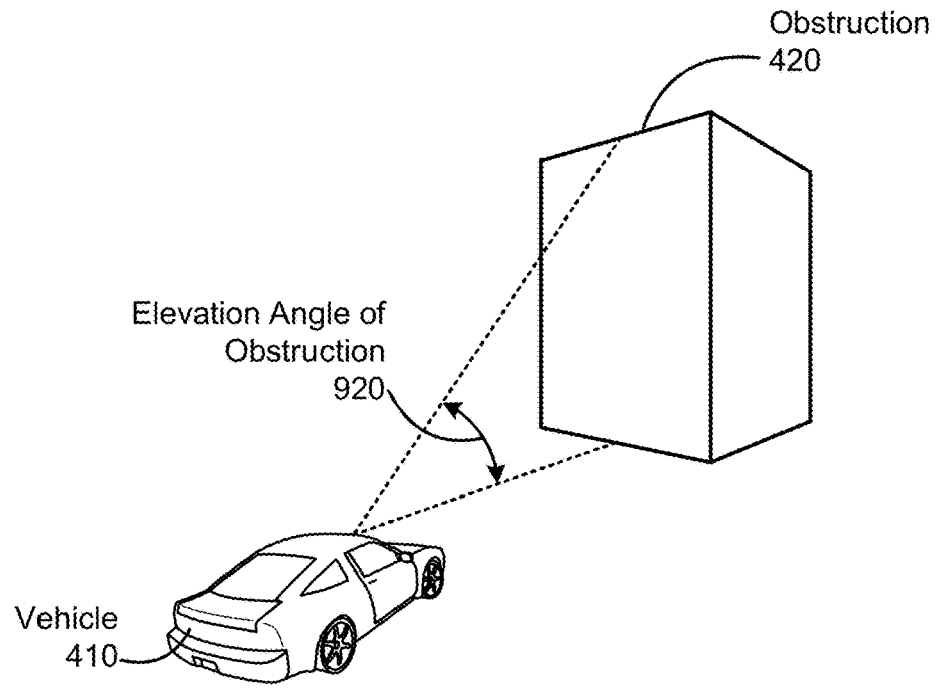

According to some embodiments, 3-D reconstruction of the obstructions 420 can be mapped onto the revised SkyPlot 600 by determining azimuth and elevation angles of an obstruction, based on the determined height, width, and distance of the obstruction. As illustrated in FIGS. 9A and 9B, the azimuth angle of an obstruction 910 is based on the width of the obstruction 420, and the elevation angle of the obstruction 920 is based on the height of the obstruction 420. According to some embodiments, the 3-D reconstruction of an obstruction, and its corresponding obstruction positions 620 in the revised SkyPlot 600 may accommodate non-rectangular obstructions, where the azimuth angle of obstruction 910 varies with the height of the obstruction 420, and/or the elevation angle of the obstruction 920 may varies with the width of the obstruction 420.

According to some embodiments, the revised sky plot 600 may be used to determine which SVs 140 may be obstructed from view by the mobile device 110 by determining whether an SV positions 610 overlaps with an obstruction positions 620. Accordingly, as the positions 610 may fall into two groups: obstructed SV positions 630 and unobstructed SV positions 640. Signals 130 from SVs 140 at unobstructed SV positions 640 are unlikely to cause multipath errors, and may therefore be used by the mobile device 110 for a GNSS position determination. On the other hand, signals 130 from SVs 140 at obstructed SV positions 630, if detected, are likely experiencing multipath and can reduce the accuracy of a GNSS position determination.

With this in mind, and referring again to FIG. 2, the functionality at block 250 comprises de-weighing data from SVs determined to be obstructed. That is, depending on desired functionality, information received from signals 130 from SVs 140 determined to be at obstructed SV positions 630 can be given a reduced amount of weight in the GNSS position determination, or ignored entirely. Where a reduced amount of weight is given, embodiments may employ multipath error correction and/or other corrective techniques to help increase the accuracy of information received from obstructed SVs 140.

Finally, at block 260, a GNSS position fix can be obtained by using data from at least the unobstructed SVs. As used herein, a "GNSS position fix" for a location refers to a determination of the position of the mobile device 110 based on GNSS data received by the mobile device 110 at the location. As a person of ordinary skill in the art will appreciate, after obtaining a GNSS position fix, the GNSS position fix can then be used by the mobile device 110 (e.g., by software applications running on the mobile device) and/or communicated to another device.

Figure 7:
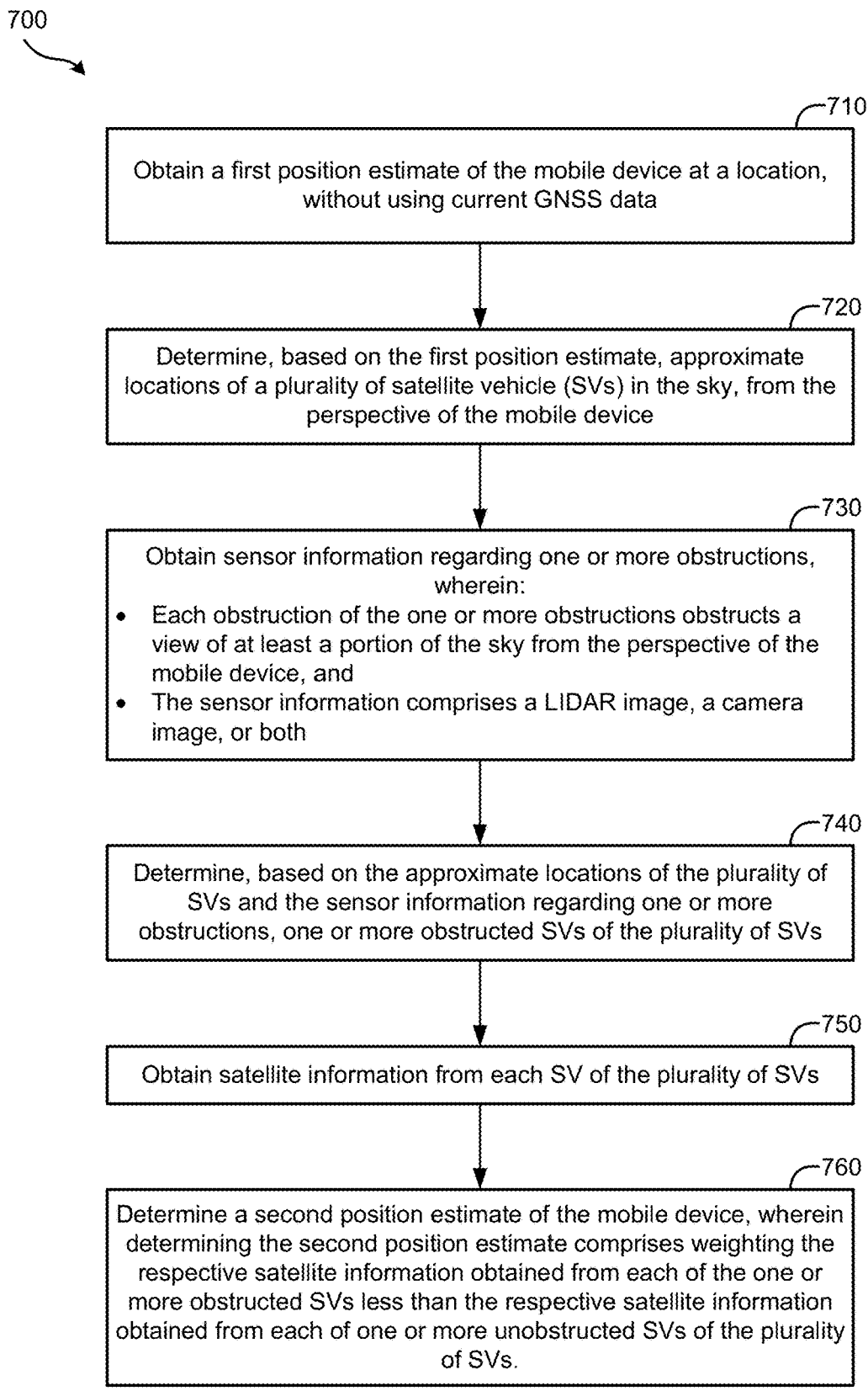
FIG. 7 is a flow diagram of a method of GNSS position determination of a mobile device, according to an embodiment.

FIG. 7 is a flow diagram of a method 700 of GNSS position determination of a mobile device, according to an embodiment. The method 700 may therefore represent a way in which the process 200 of FIG. 2 may be implemented, according to some embodiments. Means for performing the various functions illustrated in the blocks of FIG. 2 may comprise hardware and/or software elements of a mobile device, an example of which is shown in FIG. 8 and described in more detail below.

At block 710, the functionality includes obtaining a first position estimate of the mobile device at a location, without using current GNSS data. As indicated in the previously-described embodiments (e.g., in reference to block 210 of FIG. 2), this first position estimate may comprise a rough initial location estimate based on other positioning methods, such as any of the previously-described positioning techniques (Wi-Fi-based positioning, cellular-based positioning, dead reckoning, or any combination thereof). In some embodiments, previously-obtained GNSS data may be used as a basis for dead reckoning, but a new GNSS position fix is not yet obtained for the current position. Thus, no current GNSS data is used. In other words, in some embodiments, the first position estimate may comprise a coarse position based on a previously-obtained GNSS position fix and/or other positioning data (motion data, etc.). In some embodiments, a time threshold may also be used to determine whether GNSS data is current. That is, previously-obtained GNSS data may no longer be current if a threshold amount of time has lapsed since the previously-obtained GNSS data was obtained.

Means for performing the functionality at block 710 may include one or more software and/or hardware components of a mobile device. These components may include, for example, a bus 805, processing unit(s) 810, wireless communication interface 830, sensor(s) 840, memory 860, input device(s) 870, and/or other software and/or hardware components of a mobile device 110 as illustrated in FIG. 8 and described in more detail below. The wireless communication interface 830, for instance, may be used for providing Wi-Fi-based and/or cellular-based positioning based on respective Wi-Fi and/or cellular signals received by respective Wi-Fi and/or cellular transceivers of the wireless medication interface 830. As previously noted, such wireless positioning techniques may involve source-based and/or timing-based positioning, including but not limited to Cell-ID, enhanced Cell-ID, OTDOA based on PRS signals, etc.

The functionality at block 720 comprises determining, based on the first position estimate, approximate locations of a plurality of SVs in the sky, from the perspective of the mobile device. As explained with regard to FIG. 3, this may comprise using known orbital data for SVs to determine an initial SkyPlot, in which SV positions are determined with respect to azimuth and elevation angles, from the perspective of the mobile device. As a person of ordinary skill in the art will appreciate, the azimuth angles of the SkyPlot may be provided with respect to the position of the mobile device (e.g., where 0° represents the bearing of the mobile device) or an separate coordinate frame (e.g., an ENU reference frame where 0° represents true north). In the latter case, the orientation of the mobile device with respect to the separate coordinate frame can then be taken into account to determine the SV positions with respect to the orientation of the mobile device. Because orbital data may be dependent on a time of day, determining the approximate locations of a plurality of SVs from the perspective of the mobile device maybe further based on an orientation of the mobile device and a time of day. This information can be obtained by sensors, clocks, and/or other components of the mobile device, as discussed in the embodiments above. In some embodiments, for example, the method 700 may further comprise determining the orientation of the mobile device based on data from one or more motion sensors of the mobile device.

Means for performing the functionality at block 720 may include one or more software and/or hardware components of a mobile device. These components may include, for example, a bus 805, processing unit(s) 810, memory 860, input device(s) 870, and/or other software and/or hardware components of a mobile device 110 as illustrated in FIG. 8 and described in more detail below.

At block 730, sensor information regarding one or more obstructions is obtained, where each obstruction of the one or more obstructions obstructs of view of at least a portion of the sky from the perspective of the mobile device, and the sensor information comprises a LIDAR image, a camera image, or both. As previously noted, a mobile device may obtain LIDAR and/or camera images to determine nearby obstructions that may be blocking the view of the sky from the perspective of the mobile device. Sensor information, including the LIDAR and/or camera image, may be obtained from a device separate from, but in communication with, the mobile device. As previously explained with regard to FIG. 5, for instances where the mobile device comprises a mobile phone, the mobile phone may be communicatively coupled with a wearable device, such as an HMD. The mobile phone can then obtain one or more camera images from the wearable device, if needed. In some embodiments, for example, the mobile phone can determine to obtain images from the wearable device (and/or another separate device) if cameras integrated into the mobile phone are unable to capture images of the obstructions. That is, according to some embodiments, the method may comprise, for mobile device comprising a mobile phone, determining that a camera of the mobile device is not in the state to obtain information regarding the one or more obstructions, and, responsive to determining that the camera of the mobile device is not in the state to obtain the information regarding one or more obstructions, obtaining the camera image from the camera of the separate device. For embodiments where the mobile device comprises a vehicle, the sensor information may comprise a plurality of camera images taken by a respective plurality of cameras of the vehicle. This can include, for example, forward-facing cameras, side-facing cameras, backward-facing cameras and/or upward-facing cameras, from the perspective of the vehicle.

Depending on desired functionality, the sensor information may comprise raw sensor data and/or data derived therefrom. Sensor information may therefore include LIDAR and/or camera images, combinations of LIDAR images or camera images that have been "stitched" together, and/or LIDAR in camera images that have been fused. In some embodiments, obtaining the sensor information may comprise determining a height of each of the one or more obstructions, which can be determined as indicated above, based on LIDAR images and/or camera images.

Means for performing the functionality at block 730 may include one or more software and/or hardware components of a mobile device. These components may include, for example, a bus 805, processing unit(s) 810, wireless communication interface 830, sensor(s) 840, memory 860, input device(s) 870, and/or other software and/or hardware components of a mobile device 110 as illustrated in FIG. 8 and described in more detail below.

At block 740, the functionality comprises determining, based on the approximate locations of the plurality of SVs and the sensor information regarding one or more obstructions, one or more obstructed SVs of the plurality of SVs. For example, this may comprise determining how the various obstructions block the view of the sky, and whether there are any SVs 140 positioned within the blocked portions of the sky. As previously described, this may comprise determining a revised SkyPlot, as illustrated and described above with regard to FIG. 6. This can enable the determination of which SV positions are obstructed and which are not.

Means for performing the functionality at block 740 may include one or more software and/or hardware components of a mobile device. These components may include, for example, a bus 805, processing unit(s) 810, memory 860, and/or other software and/or hardware components of a mobile device 110 as illustrated in FIG. 8 and described in more detail below.

The functionality of block 750 comprises obtaining satellite information from each SV of the plurality of SVs. Here, information provided by signals from combination of obstructed and unobstructed SVs. That is, the plurality of SVs for which approximate locations are determined at block 720 may include obstructed and unobstructed SVs. It will be understood, however, that the approximate locations of additional SVs may be determined at block 720 for which no information is obtained (e.g., obstructed SVs for which no reflected or multipath signal is received at all).

Means for performing the functionality at block 750 may include one or more software and/or hardware components of a mobile device. These components may include, for example, a bus 805, processing unit(s) 810, memory 860, GNSS receiver 880, and/or other software and/or hardware components of a mobile device 110 as illustrated in FIG. 8 and described in more detail below.

At block 760, the method 700 comprises determining a second position estimate of the mobile device, wherein determining the second position estimate comprises weighting the respective satellite information obtained from each of the one or more obstructed SVs less than the respective satellite information obtained from each of the one or more unobstructed SVs of the plurality of SVs. This may include a GNSS position fix in which the information from the obstructed SVs is deweighted or disregarded entirely. That is, in some embodiments, weighting the respective information obtained from each of the one or more obstructed SVs may comprise reducing an initial weight of the respective satellite information obtained from each of the one or more obstructed SVs or disregarding the respective satellite information entirely.

Means for performing the functionality at block 760 may include one or more software and/or hardware components of a mobile device. These components may include, for example, a bus 805, processing unit(s) 810, memory 860, GNSS receiver 880, and/or other software and/or hardware components of a mobile device 110 as illustrated in FIG. 8 and described in more detail below.

FIG. 8 is a block diagram of electrical components of a mobile device 110, according to an embodiment, which can be utilized as described herein above (e.g. in association with FIGS. 1-7). For example, the mobile device 110 can perform one or more of the functions of methods of FIG. 2 and/or FIG. 7. It should be noted that FIG. 8 is meant to provide a generalized illustration of various components, any or all of which may be utilized as appropriate. It can be noted that, in some instances, components illustrated by FIG. 8 can be localized to a single physical device (e.g., integrated into a mobile phone) or distributed at various locations of the mobile device 110 (e.g., at various locations on a vehicle). Furthermore, the components illustrated in FIG. 8 may comprise only a portion of the electrical components of a mobile device 110. Where the mobile device 110 comprises a vehicle, for example, the vehicle may comprise additional components and/or systems to control functions such as steering, breaking, automated driving, dashboard input/output, etc.

The mobile device 110 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means. Location determination and/or other determinations based on wireless communication may be provided in the processing unit(s) 810 and/or wireless communication interface 830 (discussed below). The mobile device 110 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like.

The mobile device 110 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a Wide Area Network (WAN) device and/or various cellular devices, etc.), and/or the like, which may enable the mobile device 110 to communicate via cellular, Wi-Fi, and/or other networks as described herein. The wireless communication interface 830 may permit data to be communicated (e.g. transmitted and received) with network components, computer systems, and/or any other electronic devices described herein as well as private and/or public networks (e.g., the Internet). The communication can be carried out via one or more wireless communication antenna(s) 832 that send and/or receive wireless signals 834.

Depending on desired functionality, the wireless communication interface 830 may comprise separate transceivers to communicate with terrestrial transceivers, such as wireless devices, base stations, and access points. The mobile device 110 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as CDMA2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 110 can further include sensor(s) 840. As described in the embodiments above, sensors may comprise one or more components capable of obtaining information regarding obstructions surrounding the mobile device. This can include, for example, a camera, LIDAR, radar, and/or other such components. Sensor(s) 840 may additionally include one or more other sensors used in the operation of the mobile device 110, including, without limitation, one or more accelerometers, gyroscopes, magnetometers, altimeters, microphones, proximity sensors (e.g., infrared (IR) or sonar), light sensors, barometers, and the like), some of which may be used to complement and/or facilitate the position determination described herein, in some instances.

Embodiments of the mobile device 110 may also include a GNSS receiver 880 capable of receiving signals 884 from one or more GNSS satellites (e.g., signals 130 from one or more SVs 140) using an antenna 882 (which may comprise the same as antenna 832, depending on desired functionality). Positioning based on GNSS signal measurement can be utilized to complement and/or incorporate the techniques described herein. The GNSS receiver 880 can extract a position of the mobile device 110, using conventional techniques, from GNSS SVs of one or more GNSS systems, such as Global Positioning System (GPS), Galileo, Global Navigation Satellite System (GLONASS), Quasi-Zenith Satellite System (QZSS) over Japan, IRNSS over India, Beidou over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The mobile device 110 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile device 110 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the mobile device 110 (and/or processing unit(s) 810 within mobile device 110). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a (RAM), a Programmable ROM (PROM), Erasable Programmable Read-Only Memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of Global Navigation Satellite System (GNSS) position determination of a mobile device, the method comprising:
    obtaining a first position estimate of the mobile device at a location, without using current GNSS data;
    determining, based on the first position estimate, approximate locations of a plurality of satellite vehicle (SVs) in the sky, from a perspective of the mobile device;
    obtaining sensor information regarding one or more obstructions, wherein:
        each obstruction of the one or more obstructions obstructs a view of at least a portion of the sky from the perspective of the mobile device;
        the sensor information includes LIDAR data including a LIDAR image of the one or more obstructions and camera data including a camera image of the one or more obstructions; and
        obtaining the sensor information includes:
            determining whether a camera of the mobile device is in a state to obtain information regarding the one or more obstructions; and
            in response to a determination that the camera of the mobile device is in a state to obtain the information regarding the one or more obstructions, obtaining the camera image from the camera of the mobile device; or
            in response to a determination that the camera of the mobile device is not in a state to obtain the information regarding the one or more obstructions, obtaining the camera image from a camera of a head-mounted display (HMD) worn by a user of the mobile device, wherein the HMD is communicatively coupled with the mobile device;
    determining, based on the approximate locations of the plurality of SVs and the sensor information regarding one or more obstructions, one or more obstructed SVs of the plurality of SVs, wherein the determining the one or more obstructed SVs includes:
        fusing the LIDAR data and the camera data, resulting in fused data;
        determining, based on the fused data, an elevation angle of an obstruction among the one or more obstructions; and
        determining an obstructed SV of the one or more obstructed SVs based on the elevation angle of the obstruction;
    obtaining satellite information from each SV of the plurality of SVs; and
    determining a second position estimate of the mobile device, wherein determining the second position estimate comprises weighting the respective satellite information obtained from each of the one or more obstructed SVs less than the respective satellite information obtained from each of one or more unobstructed SVs of the plurality of SVs.

2. The method of claim 1, wherein weighting the respective information obtained from each of the one or more obstructed SVs less than the respective satellite information obtained from each of one or more unobstructed SVs of the plurality of SVs comprises disregarding or deweighting the respective satellite information obtained from each of the one or more obstructed SVs.

3. The method of claim 1, wherein:
    the mobile device comprises a mobile phone.

4. The method of claim 1, wherein the mobile device comprises a vehicle and the sensor information comprises a plurality of camera images taken by a respective plurality of cameras of the vehicle.

5. The method of claim 1, wherein the first position estimate is determined using:
    a coarse position based on a previously-obtained GNSS position fix,
    Wi-Fi-based positioning,
    cellular-based positioning, or
    dead reckoning,
    or any combination thereof.

6. The method of claim 1, wherein obtaining the sensor information comprises determining a height, distance, and width of each of the one or more obstructions.

7. The method of claim 1, wherein determining the approximate locations of a plurality of SVs from the perspective of the mobile device is further based on an orientation of the mobile device and a time of day.

8. The method of claim 7, further comprising determining the orientation of the mobile device based on data from one or more motion sensors of the mobile device.

9. The method of claim 8, further comprising determining an azimuth angle of an obstruction of the one or more obstructions based on the orientation and a determined width of the obstruction.

10. A mobile device comprising:
a Global Navigation Satellite System (GNSS) receiver;
a memory; and
one or more processing units communicatively coupled with the GNSS receiver and the memory and configured to:
obtain a first position estimate of the mobile device at a location, without using current GNSS data;
determine, based on the first position estimate, approximate locations of a plurality of satellite vehicle (SVs) in the sky, from a perspective of the mobile device;
obtain sensor information regarding one or more obstructions, wherein:
each obstruction of the one or more obstructions obstructs a view of at least a portion of the sky from the perspective of the mobile device;
the sensor information includes LIDAR data including a LIDAR image of the one or more obstructions and camera data including a camera image of the one or more obstructions; and
to obtaining the sensor information, the one or more processing units are configured to:
determine whether a camera of the mobile device is in a state to obtain information regarding the one or more obstructions; and
in response to a determination that the camera of the mobile device is in a state to obtain the information regarding the one or more obstructions, obtain the camera image from the camera of the mobile device; or
in response to a determination that the camera of the mobile device is not in a state to obtain the information regarding the one or more obstructions, obtain the camera image from a camera of a head-mounted display (HMD) worn by a user of the mobile device, wherein the HMD is communicatively coupled with the mobile device;
determine, based on the approximate locations of the plurality of SVs and the sensor information regarding one or more obstructions, one or more obstructed SVs of the plurality of SVs, wherein, to determine the one or more obstructed SVs, the one or more processing units is configured to:
fuse the LIDAR data and the camera data, resulting in fused data;
determine, based on the fused data, an elevation angle of an obstruction among the one or more obstructions; and
determine an obstructed SV of the one or more obstructed SVs based on the elevation angle of the obstruction;
obtain, using the GNSS receiver, satellite information from each SV of the plurality of SVs; and
determine a second position estimate of the mobile device, wherein, to determine the second position estimate, the one or more processing units is configured to weight the respective satellite information obtained from each of the one or more obstructed SVs less than the respective satellite information obtained from each of one or more unobstructed SVs of the plurality of SVs.

11. The mobile device of claim 10, wherein, to weight the respective information obtained from each of the one or more obstructed SVs less than the respective satellite information obtained from each of one or more unobstructed SVs of the plurality of SVs, the one or more processing units is configured to disregard or deweight the respective satellite information obtained from each of the one or more obstructed SVs.

12. The mobile device of claim 10, further comprising a communication interface, wherein:
the communication interface is configured to be communicatively coupled with the HMD.

13. The mobile device of claim 10, wherein:
the mobile device comprises a vehicle; and
to obtain the sensor information regarding one or more obstructions, the one or more processing units is configured to obtain a plurality of camera images taken by a respective plurality of cameras of the vehicle.

14. The mobile device of claim 10, wherein, to obtain the first position estimate, the one or more processing units is configured to use:
a coarse position based on a previously-obtained GNSS position fix,
Wi-Fi-based positioning,
cellular-based positioning, or
dead reckoning,
or any combination thereof.

15. The mobile device of claim 10, wherein, to obtain the sensor information, the one or more processing units is configured to determine a height, distance, and width of each of the one or more obstructions.

16. The mobile device of claim 10, wherein, to determine the approximate locations of a plurality of SVs from the perspective of the mobile device, the one or more processing units is configured to determine an orientation of the mobile device and a time of day.

17. The mobile device of claim 16, wherein the one or more processing units is further configured to determine the orientation of the mobile device based on data from one or more motion sensors of the mobile device.

18. The mobile device of claim 17, wherein the one or more processing units is further configured to determine an azimuth angle of an obstruction of the one or more obstructions based on the orientation and a determined width of the obstruction.

19. A device for making a Global Navigation Satellite System (GNSS) position determination of a mobile device, the device comprising:
means for obtaining a first position estimate of the mobile device at a location, without using current GNSS data;
means for determining, based on the first position estimate, approximate locations of a plurality of satellite vehicle (SVs) in the sky, from a perspective of the mobile device;
means for obtaining sensor information regarding one or more obstructions, wherein:
each obstruction of the one or more obstructions obstructs a view of at least a portion of the sky from the perspective of the mobile device;
the sensor information includes LIDAR data including a LIDAR image of the one or more obstructions and camera data including a camera image of the one or more obstructions; and
the means for obtaining the sensor information includes:
means for determining whether a camera of the mobile device is in a state to obtain information regarding the one or more obstructions; and
means for:
obtaining the camera image from the camera of the mobile device in response to a determination that the camera of the mobile device is in a state to obtain the information regarding the one or more obstructions; or obtaining the camera image from a camera of a head-mounted display (HMD) worn by a user of the mobile device, wherein the HMD is communicatively coupled with the mobile device, in response to a determination that the camera of the mobile device is not in a state to obtain the information regarding the one or more obstructions;

means for determining, based on the approximate locations of the plurality of SVs and the sensor information regarding one or more obstructions, one or more obstructed SVs of the plurality of SVs, wherein the means for determining the one or more obstructed SVs includes:

means for fusing the LIDAR data and the camera data, resulting in fused data;

means for determining, based on the fused data, an elevation angle of an obstruction among the one or more obstructions; and means for determining an obstructed SV of the one or more obstructed SVs based on the elevation angle of the obstruction;

means for obtaining satellite information from each SV of the plurality of SVs; and means for determining a second position estimate of the mobile device, wherein the means for determining the second position estimate comprise means for weighting the respective satellite information obtained from each of the one or more obstructed SVs less than the respective satellite information obtained from each of one or more unobstructed SVs of the plurality of SVs.

20. The device of claim 19, wherein the means for weighting the respective information obtained from each of the one or more obstructed SVs less than the respective satellite information obtained from each of one or more unobstructed SVs of the plurality of SVs comprise means for disregarding or deweighting the respective satellite information obtained from each of the one or more obstructed SVs.

21. The device of claim 19, further comprising means for determining the first position estimate by using:

a coarse position based on a previously-obtained GNSS position fix,
Wi-Fi-based positioning,
cellular-based positioning, or
dead reckoning,
or any combination thereof.

22. The device of claim 19, wherein the means for obtaining the sensor information comprises means for determining a height, distance, and width of each of the one or more obstructions.

23. The device of claim 19, wherein the means for determining the approximate locations of a plurality of SVs from the perspective of the mobile device further comprises means for determining an orientation of the mobile device and a time of day.

24. A non-transitory, computer-readable medium having instructions stored thereby for Global Navigation Satellite System (GNSS) position determination of a mobile device, wherein the instructions, when executed by one or more processors, cause the one or more processors to:

obtain a first position estimate of the mobile device at a location, without using current GNSS data;

determine, based on the first position estimate, approximate locations of a plurality of satellite vehicle (SVs) in the sky, from a perspective of the mobile device;

obtain sensor information regarding one or more obstructions, wherein:

each obstruction of the one or more obstructions obstructs a view of at least a portion of the sky from the perspective of the mobile device;

the sensor information includes LIDAR data including a LIDAR image of the one or more obstructions and camera data including a camera image of the one or more obstructions; and the instructions, when executed by the one or more processors, cause the one or more processors to obtain the sensor information by:

determining whether a camera of the mobile device is in a state to obtain information regarding the one or more obstructions; and in response to a determination that the camera of the mobile device is in a state to obtain the information regarding the one or more obstructions, obtaining the camera image from the camera of the mobile device; or in response to a determination that the camera of the mobile device is not in a state to obtain the information regarding the one or more obstructions, obtaining the camera image from a camera of a head-mounted display (HMD) worn by a user of the mobile device, wherein the HMD is communicatively coupled with the mobile device;

determine, based on the approximate locations of the plurality of SVs and the sensor information regarding one or more obstructions, one or more obstructed SVs of the plurality of SVs, wherein the determining the one or more obstructed SVs includes:

fusing the LIDAR data and the camera data, resulting in fused data;

determining, based on the fused data, an elevation angle of an obstruction among the one or more obstructions; and determining an obstructed SV of the one or more obstructed SVs based on the elevation angle of the obstruction;

obtain satellite information from each SV of the plurality of SVs; and determine a second position estimate of the mobile device, wherein determining the second position estimate comprises weighting the respective satellite information obtained from each of the one or more obstructed SVs less than the respective satellite information obtained from each of one or more unobstructed SVs of the plurality of SVs.

* * * * *